(No Model.)
A. DILLENBACK.
THILL SUPPORT.
No. 442,866. Patented Dec. 16, 1890.
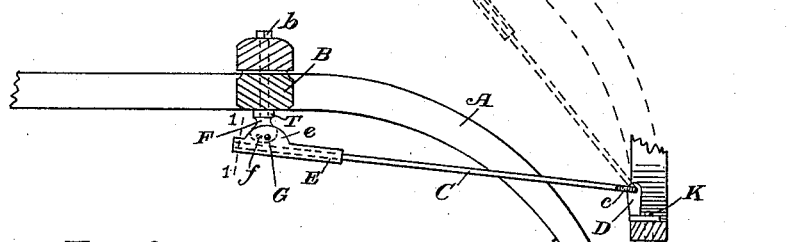
Fig.3.
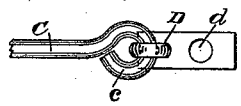
Fig.4.
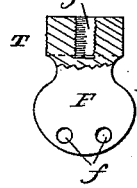
Fig.10.
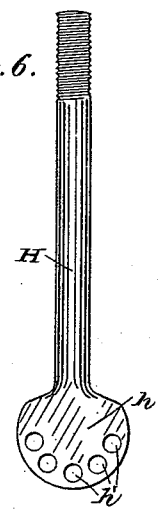
Fig.6.
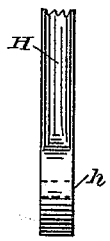
Fig.7.
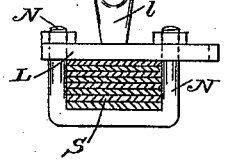
Fig.8. Fig.9.
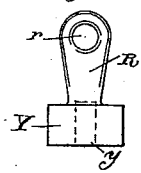
Fig.11
WITNESSES:
John W. Fisher
John U. Mayer
INVENTOR
Alonzo Dillenback
BY
Frederick W. Cameron
ATTORNEY.

UNITED STATES PATENT OFFICE.

ALONZO DILLENBACK, OF PALATINE BRIDGE, NEW YORK.

THILL-SUPPORT.

SPECIFICATION forming part of Letters Patent No. 442,866, dated December 16, 1890.

Application filed April 24, 1890. Serial No. 349,301. (No model.)

*To all whom it may concern:*

Be it known that I, ALONZO DILLENBACK, a citizen of the United States, residing at Palatine Bridge, county of Montgomery, State of New York, have invented a new and useful Improvement in Thill-Supporters, of which the following is a specification.

My invention relates to improvements in mechanism for holding the shafts of a carriage or cutter in an elevated position when the vehicle is not in use; and the object of my invention is to provide an automatic thill-supporter which may be attached to the thill at or near the whiffletree-bar, and which may be adjusted so as to hold the thill in any desired position. I attain this object by means of the mechanism illustrated in the accompanying drawings, in which—

Figure 1 is a perspective view of my invention in operation. Fig. 2 is a section along the lines 1 1 on Fig. 1. Fig. 3 is a plan of the sleeve E. Fig. 4 shows one manner of attaching the rod C to a carriage. Fig. 5 is a plan of the nut T. Fig. 6 is a view of the whiffletree-bolt H. Fig. 7 is an end view of the bolt H. Fig. 8 shows the clip L attached to a carriage-spring. Fig. 9 is a plan of the clip L. Fig. 10 shows the eccentric portion of the nut T; Fig. 11, a nut to be placed on the king-bolt, to which the rod C may be attached.

Similar letters refer to similar parts throughout the several views.

A represents a thill of a carriage, cutter, or other vehicle, secured to the carriage by means of the bolt *a*. On the king-bolt near its upper end I place the stud D, to which I secure by means of hook and eye the rod C. The opposite end of the rod C is provided with a sleeve E, which reciprocates freely upon said rod, and which is attached to the whiffletree-bar B by means of the nut T, attached to the sleeve E and secured onto the end of the whiffletree-bolt *b*. The nut T is provided with a flattened projecting portion F, (see Fig. 10,) through which I make the holes *f* outside of the center and near the edge farthest from the nut. I cut a slot *e'* in the upper surface of the sleeve E. On each side of the slot *e'* I place the upwardly-projecting pieces *e*, and place the flattened end F of the nut T between the projections *e* and secure it thereto by means of a pin G, passing through the projections and also through one of the holes near the edge of the portion F of the nut T.

The position of the end of the nut T in the sleeve E is such that when the nut T is vertical the rod C is not in contact with it; but when the nut T is moved forward toward the end of the thill the edge of the forward portion of the projection F on the nut T will come in contact with the rod C, forming an eccentric catch, preventing the passage of the sleeve along the rod C. The position of the bolt passing through the portion F of the nut T may be changed to suit the convenience of the circumstances attending its use, it simply being necessary to make it eccentric.

I do not limit myself to the use of the nut T for the purpose of attaching my supporter to the thills. I sometimes use the bolt H, (see Fig. 6,) having its head *h* flattened and provided along its edge with holes *h'* off of the center, through which the pin G may be placed, and by means of which the rod C is held firmly in position, in the same manner as referred to in reference to the nut T.

I do not limit myself to the method already described of attaching the end of the rod C to a carriage. A bar L (see Fig. 8) may be secured to the spring S by means of the clip N. The bar L is usually provided with a slotted opening L', through which one end of the clip N passes in order that it may be easily adjusted to the spring S. Another method of attaching the rod C to a carriage is by placing the nut Y (see Fig. 11) onto the king-bolt K, the nut being provided with a stud R with an eye, into which is hinged the end *c* of the rod C.

When the thills are in the position shown by full lines in Fig. 1, the loose end of the rod C is within the sleeve E and does not interfere in any way with the horse. When the vehicle is not being used, the thills may be raised to the position shown by dotted lines in Fig. 1. The rod C will then extend beyond the sleeve E, which slides freely along the rod, and the weight of the thills will cause the forward portion of the eccentric F to press tightly against the rod C, preventing the sleeve E from slipping on the rod, thus causing the thills to be held securely in their elevated position. It is apparent that the thills may be held securely in position at any desired height above the horizontal in the same manner as already described. When it becomes necessary to lower the thills for the purpose of using them, a slight jerk or upward movement will disengage the eccentric with the rod and they may be drawn downward to the position desired. The eccentric forms an automatic catch, and at whatever position the thills are placed when thrown up above the horizontal they will be immediately, positively, and securely held in that position.

I have shown the rod C straight. It may be slightly curved, in order to correspond to an increased bow of the thill.

I sometimes vulcanize that portion of the loose end of the rod C that passes within the sleeve for the purpose of preventing a rattle.

My invention is simple in its construction and operation, easily attached to a wagon, and performs the work required of it in a positive and satisfactory manner.

What I claim as my invention, and desire to secure by Letters Patent, is—

1. In a thill-supporter, the combination, with an axle, of a vehicle and a rod hinged thereto and projecting forward between the thills, with a sleeve reciprocating on said rod, said sleeve provided with an automatic catch and secured to the cross-piece between the thills, all substantially as described, and for the purpose set forth.

2. In a thill-supporter, a rod attached at one end to a vehicle, provided near its opposite end with a reciprocating sleeve, said sleeve provided with a slot, in which is secured an eccentric catch operating in connection with said rod, and provided with a nut attached to the end of a whiffletree-bolt, all substantially as described, and for the purpose set forth.

3. In a thill-supporter, a rod hinged at one end to a vehicle, provided near its opposite end with a reciprocating slotted sleeve, said sleeve attached to the cross-piece between the thills, all substantially as described, and for the purpose set forth.

4. In a thill-supporter, a combination of a rod provided with an eye at one end articulating with an eye in a stud attached to a vehicle, said rod provided with a reciprocating sleeve attached eccentrically to a whiffletree-bar, all substantially as described, and for the purpose set forth.

5. In a thill-supporter, a combination of a rod articulating with a stud attached to a bar secured by a clip to the spring of a carriage, said rod provided with a sleeve to which is attached an eccentric catch operating in connection with said rod and secured to the whiffletree-bar, all substantially as described, and for the purpose set forth.

ALONZO DILLENBACK.

Witnesses:
HIRAM L. HUSTON,
MARY E. DILLENBACK.